United States Patent [19]

Makram-Ebeid

[11] Patent Number: 5,630,020
[45] Date of Patent: May 13, 1997

[54] LEARNING METHOD AND NEURAL NETWORK STRUCTURE

[75] Inventor: Sherif Makram-Ebeid, Gif sur Yvette, France

[73] Assignee: U.S. Philips Corporation, New York, N.Y.

[21] Appl. No.: 363,554

[22] Filed: Dec. 21, 1994

Related U.S. Application Data

[63] Continuation of Ser. No. 839,020, Feb. 18, 1992, abandoned, which is a continuation of Ser. No. 533,651, Jun. 5, 1990, abandoned.

[30] Foreign Application Priority Data

Jun. 9, 1989 [FR] France ................................ 89 07662

[51] Int. Cl.$^6$ ................................................ G06F 15/18
[52] U.S. Cl. .............................................. 395/23; 395/24
[58] Field of Search ........................... 395/23, 24, 27

[56] References Cited

U.S. PATENT DOCUMENTS 4,933,872  6/1990  Vandenberg et al. ................... 382/14
4,994,982  2/1991  Duvanton et al. ..................... 395/27

OTHER PUBLICATIONS

"Parallel Distributed Processing", vol. 1, David E. Rumelhart, 1989.
"Neural Computing: Theory and Practice", Philip D. Wasserman, Apr. 1989.
"An Analog VLSI Implementation of Hopfield's Neural Network", 1989 IEEE, Michel Verleysen and Paul G. A. Jespers.
"Neural Network, Part 2: What are They and Why is Everybody So Interested in Them Now", Philip D. Wasserman.

*Primary Examiner*—George B. Davis
*Attorney, Agent, or Firm*—Jack E. Haken

[57] ABSTRACT

The invention relates to a method of learning which is carried out in a neural network operating on the basis of the gradient back-propagation algorithm. In order to determine the new synaptic coefficients with a minimum learning period, the invention introduces parameters which privilege corrections based on the sign of the error at the start of learning and which gradually induce less coarse corrections. This can be complemented by other parameters which favor a layer-wise strategy, accelerating the learning in the input layers with respect to the output layers. It is also possible to add a strategy which acts on the entire neural network.

7 Claims, 3 Drawing Sheets

LEARNING METHOD AND NEURAL NETWORK STRUCTURE

This is a continuation of application Ser. No. 07/839,020, filed Feb. 18, 1992, now abandoned which is a continuation of application Ser. No. 07/533,651, filed Jun. 5, 1990, now abandoned.

FIELD OF THE INVENTION

The invention relates to a learning method which is carried out in a neural network which performs learning phases in order to adapt its synaptic coefficients on the basis of examples by means of the error gradient back propagation algorithm. The invention also relates to a neural network structure and a programmed calculator for carrying out such a method.

BACKGROUND OF THE INVENTION

Neural networks are used for image processing, speech processing etc.

Neural networks are formed by automatic devices which are interconnected by synapses with associated synaptic coefficients. They enable the solution of problems which are difficult to solve by means of conventional sequential computers.

In order to carry out a given processing operation, the neural networks must learn in advance how to carry out such operations. This so-called learning phase utilizes examples where, on the basis of input data, the results to be obtained on the output are known in advance. During a first period, the neural network which has not yet been adapted to the desired task will deliver incorrect results. An error $E^p$ is then determined associated with the results obtained and those which should have been obtained and, on the basis of an adaptation criterion, the synaptic coefficients are modified in order to enable the neural network to learn the chosen example. This step is repeated for the number of examples considered to be necessary for satisfactory learning by the neural network.

A widespread method for carrying out this adaptation is the gradient back-propagation. The components of the gradient $g_{j,L}$ of the preceding error $E^p$ (calculated on the last layer L) are then determined for each neuron state $x_{j,L}$. These components are subsequently back-propagated in the neural network, starting from its outputs, in order to determine first of all the internal components $g_{j,l}$ ($l \neq L$), followed by the corrections to be applied to the synaptic coefficients $W_{ij,l}$ of the relevant neurons. This method is described, for example in the documents:

D. E. Rumelhart, D. E. Hinton, and R. J. Williams "Learning Internal Representation by Error Propagation", in D. E. Rumelhart, and J. L. McClelland (Eds), "Parallel Distributed Processing: Exploration in the Microstructure of Cognition", Vol. 1, Foundations, MIT Press (1986).

"Experiments on neural net recognition of spoken and written text", D. J. Burr, IEEE Trans. on Acoustic, speech and signal processing, Vol. 36, No. 7, July 1988, page 1162.

However, when such a method is carried out in a neural network, the learning periods may become very long for given applications. For example, this difficulty has been encountered in the case of the parity problem. The parity problem occurs, for example, in the case of a neural network whose inputs are linked to binary signals 1/0 and whose output is to deliver a state 1 when the number of "1" inputs is odd, and a state 0 in the opposite case. The learning problem is then due to the fact that the output state must change when a single one of the inputs changes its state, while when an even number of input state changes occurs, the output must remain unchanged.

Moreover, for example, when the neural network is used for classification problems, it may be difficult to distinguish of the classes wherebetween the minimum distance is small, because the neural network requires a long period of time for learning to differentiate between different classes. This obstructs the separation of the continuously encoded input data, particularly when some of these examples, relating to different classes, have inputs which differ only very little from one another.

The problem to be solved, therefore, consists in the reduction of the learning time of the neural network while minimizing the necessary supplementary hardware.

SUMMARY OF THE INVENTION

The solution consists of a method of learning which is executed in a neural network consisting of L layers and which comprises the steps of:

determining the states $x_{j,l}$ of the neurons of a layer 1 on the basis of output potentials $Y_{i,l-1}$ supplied by the neurons of the preceding layer which are connected thereto by way of synaptic coefficients $W_{ij,l}$, or on the basis of input data $Y_{i,o}$ for the layer l=1, so that:

$$x_{j,l} = \sum_i W_{ij,l} \cdot y_{i,l-1}$$

determining of the potentials $Y_{j,l}$ of the output neurons by application of a non-linear function F so that:

$$Y_{j,l} = F(x_{j,l})$$

where:
 l: index of the layer considered, $1 \leq l \leq L$
 j: index of the neuron in the output layer l
 i: index of the neuron in the input layer l–1 the method comprising learning phases by iteration by means of P examples which are successively applied to the inputs of the neural network, involving:

initialisation of the synaptic coefficient matrix $W_{ij,l}$ of the neural network, introduction of input data $Y_{j,o}^p$ of each example p intended for learning, comparison of the results $Y_{j,L}$ obtained in the output layer L with the output $y_j^p$ envisaged for this example p presented to the input in order to define a partial error $E_j^p$, determination of the sum $E^p$ of all partial errors $E_j^p$ observed for each output neuron and for each example p, determination of the various components of the gradient $g_{j,L} = \partial E^p / \partial x_{j,L}$ of the error $E^p$ with respect to the states $x_{j,L}$ for the output layer L, carrying out the method of back propagation of the components $g_{j,L}$ of the gradient so that the neural network determines the components $g_{j,l}$ of the gradient for the other layers on the basis of the transposed synaptic coefficient matrix, determination of the subsequent variations $\Delta x_{j,l}$, having a sign which opposes that of the corresponding component $g_{j,l}$, in order to adapt the neural network, updating of the synaptic coefficj. ents on the basis of these variations $\Delta x_{j,l}$, characterized in that for determining the subsequent variations $\Delta x_{j,l}$ of the neuron states, the method comprises a step for multiplying the components $g_{j,l}$ of the gradient by parameters $\theta_{j,l}$ in order to calculate variations $\Delta x_{j,l}$ which are proportional to $-\theta_{j,l} g_{j,l}$, where $\theta_{j,l}$ depends on the state of the neuron j of the layer l where $\theta_{j,l}=1$ when $-g_{j,l}$ and $x_{j,l}$ have a different sign, and $\theta_{j,l}=\theta_l^+$ when $-g_{j,l}$ and $x_{j,l}$ have the same sign, where $0 \leq \theta_l^+ \leq 1$.

During the learning process a given example p is presented. The data associated with the example p and introduced via the inputs of the neural network will produce, on the last layer L of the network, a result $y_{j,L}$ for a given output neuron j. From the start the result $y_j^p$ to be achieved is known Thus, for an example an error can be calculated as:

$$E_p = 1/2 \sum_{j=1}^{I(L)} (y_j^p - y_{j,L})^2$$

This is the expression for calculating a mean square error. Another comparison criterion may also be used.

In accordance with the known gradient back-propagation method, the components $g_{j,l}$ of the error gradient are determined for each contribution of a state $x_{j,l}$ of a neuron, so that $g_{j,l} = \alpha E^p / \alpha x_{j,l}$,
where $x_{j,l}$ represents the state of the neuron before application of the non-linear function. Therefore, the components $g_{j,L} = \alpha E^p / \alpha x_{j,L}$ relating to the output layer L so that $g_{j,L} = (y_{j,L} - y_j^p) \cdot F'_{j,L}$, where $F'_{j,L}$ is the derivative of the non-linear output functions.

The neural network is then loaded with the transpored synaptic coefficient matrix $W_{ji,l}$ and the components $g_{j,L}$ are back-propagated in the network as from its output. The network thus determines the other components $g_{j,l}$ of the gradient with $l \neq L$. These coponents $g_{g,l}$ are used for determining the variations $\Delta x_{j,l}$ which serve to correct the synaptic coefficients $W_{ij,l}$ in order to ensure that the network is adapted to the relevant example.

Generally speaking, this correction according to the known method is performed so that $W_{ij,l}$ (new)$=W_{ij,l}$ (old) $+k.\Delta x_{j,l}.y_{i,l-1}$.

In accordance with the invention, the components $g_{j,l}$ are not used as such, but each component is multiplied in advance by a respective parameter $\theta_{j,l}$ which depends for a given neuron j on the sign:

of the state $x_{j,l}$ of this neuron, and on the sign of the component of the gradient $g_{j,l}$.

These parameters are $\theta_{j,l}=1$ if $-g_{j,l}$ and $x_{j,l}$ have a different sign, and $\theta_{j,l}=\theta_1^+$ if $-g_{j,l}$ and $x_{j,l}$ have the same sign, where $0 \leq \theta_l^+ \leq 1$.

However, in order to accelerate the learning process, during the first learning iterations, for each given example $\theta_l^+$ is preferably chosen to be either close to zero or equal to zero.

In the course of later learning iterations it is additionally possible to make the value $\theta_l^+$ increase towards the value 1 for each given example.

Preferably, the sign strategy in accordance with the invention enables, at the start of learning, the corrections performed to take into account the sign of the error observed and as the learning advances the strategy gradually permits less rough corrections to be made with a higher precision.

The non-linear functions for determining the output potentials may be chosen to be slightly or strongly non-linear. In order to increase the efficiency of the sign strategy in accordance with the invention, the choice of these non-linear functions can be modified during the learning process. However, the variations $\Delta x_{j,l}$ stemming from the gradient back-propagation method may not lead to excessive variations of the synaptic coefficients. Thus according to a complementary version in accordance with the invention, a standardization is performed so that the sum of the squares of the synaptic coefficients remains quasi-constant.

The non-linear functions are thus chosen to be slightly non-linear at the start of learning and approach sign-type functions at the end of learning; in order to enable this choice, the synaptic coefficients converging towards a given neuron j keep a standard $$\sum_i (W_{ij,l})^2$$

quasi-constant.

These non-linear functions F are for example of the type $y_{j,l}=\tanh(x_{j,l}/T_l)$ where $T_l$ is a parameter which relates to the layer l and which is referred to as the temperature of the layer l.

The variations introduced during the learning process as regards the degree of non-lineariy of the non-linear functions are obtained by variation of the parameters $T_l$ for each layer.

The sign strategy in accordance with the invention, consisting first of all of the privileging of rough corrections ($\theta^+$ small and positive) based on the error sign, followed by refinement by way of the parameters $\theta^+$ in the vicinity of unity in order to perform corrections having a greater precision, may give rise to a similar effect at the level of the overall structure. To this end, for each example each component $E_j^p$ of the error $E^p$ is itself multiplied by a parameter $\eta_{j,L}$. Thus, corrections (parameter $\eta_{j,L}$) which simultaneously relate to all neuron states together may be superposed on each of the individual corrections performed for each state (parameter $\theta^+$).

For the benefit of tke previously presented sign strategy a correction factor $\eta_{j,L}$ is introduced which depends on each output neuron j of the last layer L. The error $E^p$ is then determined as:

$$E^p = \Sigma \eta_{j,L} E_j^p$$

where $$E_j^p = \tfrac{1}{2}(y_j^p - y_{j,L})^2.$$

This error is a square function.

Generally speaking, for each output neuron j of the layer L (for a given example p) this error $E_j^p$ is:

$$E_j^p = H(y_j^p - y_{j,L})$$

where H is a function of the difference between the result $Y_{j,L}$ obtained and the envisaged result $y_j^p$.

The error $E^p$ thus determined is used for determining the components $g_{j,L}$ and $g_{j,l}$ (where $l \neq L$) of the gradient as developed above.

Thus, for determining these components of the gradient the method comprises a step for determining the error $E^p$ by applying in advance a correction factor $\eta_{j,L}$ which depends on the neuron j of the last layer L so that $$E^p = \sum_{j=1}^{I(L)} \eta_{j,L} \cdot E_j^p$$

in order to favor the start of learning, where $\eta_{j,L}=1$ if $y_j^p$ and $Y_{j,L}$ are of different sign and $\eta_{j,L}=\eta^+$ if $y_j^p$ and $y_{j,L}$ have the same sign, where $0 \leq \eta^+ \leq 1$.

In the present case, $\eta_{j,L}=\theta_{j,L}$.

Preferably each partial error $E_j^p$ is the square error $\frac{1}{2}(y_j^p - y_{j,L})^2$.

According to a subsidiary version, the strategy can be developed at the level of each layer of the neural network. Taking into account the dominant role devolved on the input layers, the learning is accelerated for the input layers and slowed down for the output layers.

In the conventional application of the gradient back-propagation method, the state of a neuron $x_{x,l}$ is modified by a quantity $-\Delta x_{j,l}$ which takes into account the corresponding component of the gradient $g_{j,l}$. This takes place by multiplying each component of the gradient $g_{j,l}$ by a proportionality constant which is the same for all layers of the neural network.

According to the subsidiary version, the invention proposes the execution of the correction by assigning to each neuron of each layer a proportionality coefficient $\beta_{j,l}$ so that each correction $-\Delta x_{j,l}$ is proportional to $\beta_{j,l} \cdot g_{j,l}$.

The parameter $\beta_{j,l}$ is related to the sign strategy described above by taking it to be proportional to the parameter $\theta_{j,l}$ which serves to determine the corrections $\Delta x_{j,l}$.

Thus, $\beta_{j,l}$ is proportional to $\beta_l \cdot \theta_{j,l}$, where $\beta_l$ is a parameter which is identical for any given layer l. According to this subsidiary version, to each layer l there is assigned a parameter $\beta_l$ which enables control of the learning speed in the input layers with respect to that in the output layers. Therefore, the parameter $\beta_l$ decreases as l increases from the input layer towards the output layer.

The invention thus comprises a step for multiplying the components $\theta_{j,l} \cdot g_{j,l}$ by constants $\beta_l$ which depend on each layer, so that it is ensured that $-\Delta x_{j,l}$ is proportional to $\beta_l \cdot \theta_{j,l} \cdot g_{j,l}$, where $\beta_l$ decreases strictly in accordance with the number of the layer, proceeding from the input layers to the output layers, in order to ensure that the corrections applied to the neuron states enable acceleration of learning in the input layers and deceleration of learning in the output layers.

BRIEF DESCRIPTION OF THE DRAWINGS

The invention will he described in detail hereinafter, by way of example, with reference to the accompanying diagrammatic drawings. Therein.

DESCRIPTION OF EMBODIMENTS

Figure 1:
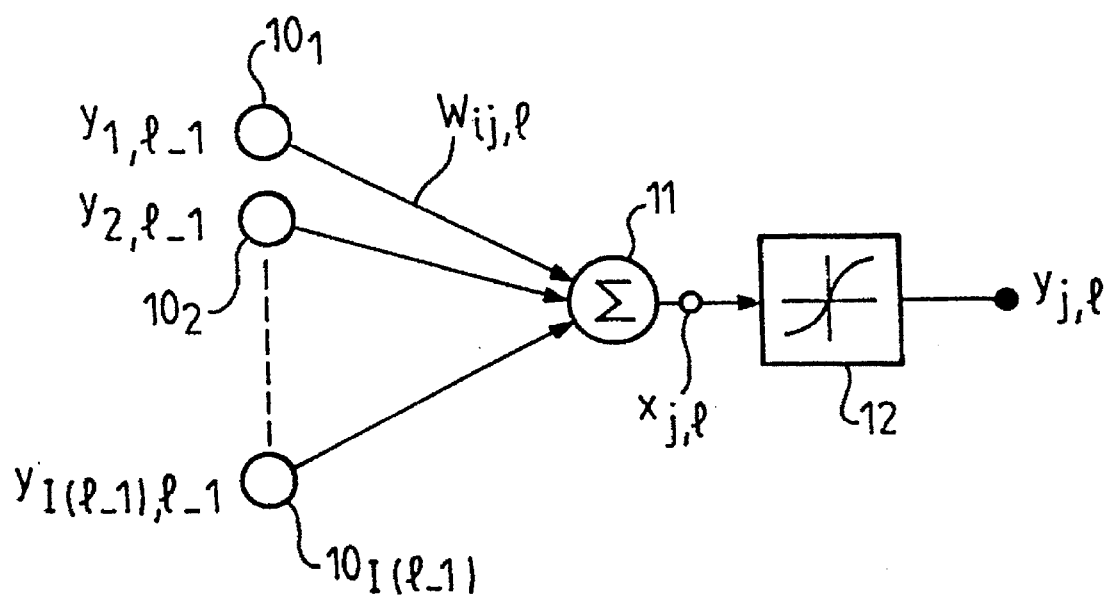
FIG. 1 shows a diagram indicating the processing mechanisms executed by a structure comprising a layer of input neurons and an output neuron.

FIG. 1 shows the conventional diagram of an operation executed by an elementary neural network formed by an input layer comprising several neurons $10_1 \ldots 10_{I(l-1)}$ which supply the input signals $y_{1,l-1}, y_{2,l-1}, \ldots y_{I(l-1),l-1}$, respectively to a single output neuron whose state is $x_{j,l}$. This state is determined by calculation means 11 so that:

$$x_{j,l} = \Sigma_i W_{ij,l} \cdot y_{i,l-1}.$$

This state $x_{j,l}$ is operated upon by a non-linear function (block 12) in order to provide the output potential $Y_{j,l}$ after application of this function F:

$$y_{j,l}=F(x_{j,l})$$

Figure 2:
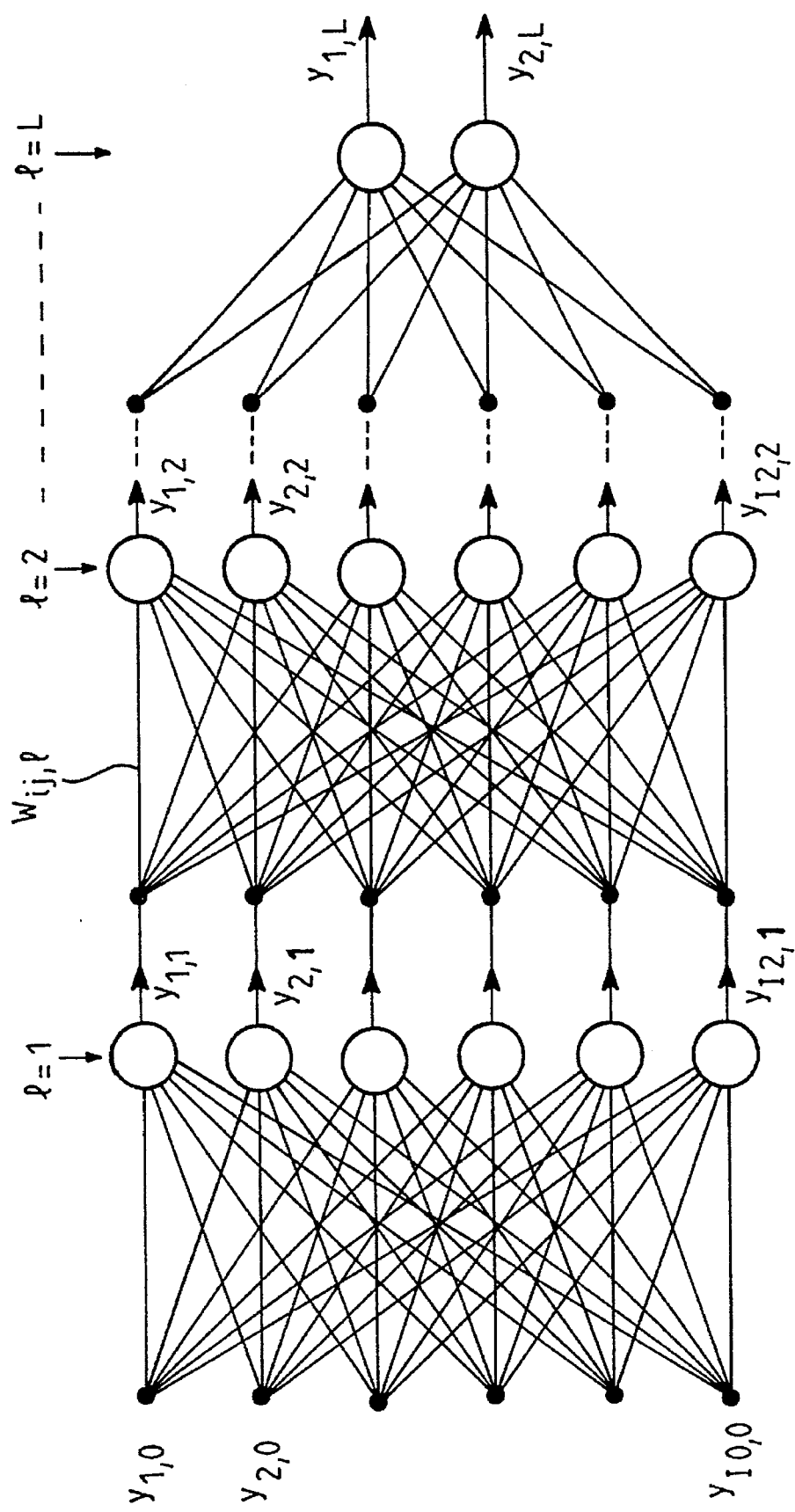
FIG. 2 shows a diagram of a structure comprising several layers: input layer, hidden layers, output layer.

This output potential $Y_{j,l}$ can then serve as the input state for a subsequent layer. Thus, an arrangement layers is obtained as shown in FIG. 2, comprising an input layer l=1, hidden layers l=2, 3, and an output layer l=L, The neurons of a layer are linked exclusively to those of the subsequent layer by way of synaptic coefficients $W_{ij,l}$. Each neuron state is determined according to the foregoing expressions, starting with the layer l=1.

In order to carry out the learning process, that is to say adaptation of the synaptic coefficients $W_{ij,l}$ to a given task, examples are presented to the input for which the desired results $y_j^p$ on the output layer are known in advance. For each example the error $E^p$ is calculated for all output states, after which its partial derivatives are determined with respect to $\alpha x_{j,l}$ for each intermediate state. The components $g_{j,l}$ of the gradient are such that $g_{j,l}=\alpha E^p/\alpha x_{j,l}$.

Thus, the components $g_{j,L}$ in the output layer are calculated and subsequently back propagated in the neural network which givs the other components $g_{j,l}$ of the error gradient. These components enable determination of the variations $\Delta x_{j,l}$ which are deduced therefrom for the states $x_{j,l}$ in order that the neural network is adapted to the task envisaged. This operation precedes the updating of the synaptic coefficients $W_{ij,l}$ as has already been indicated.

Figure 3:
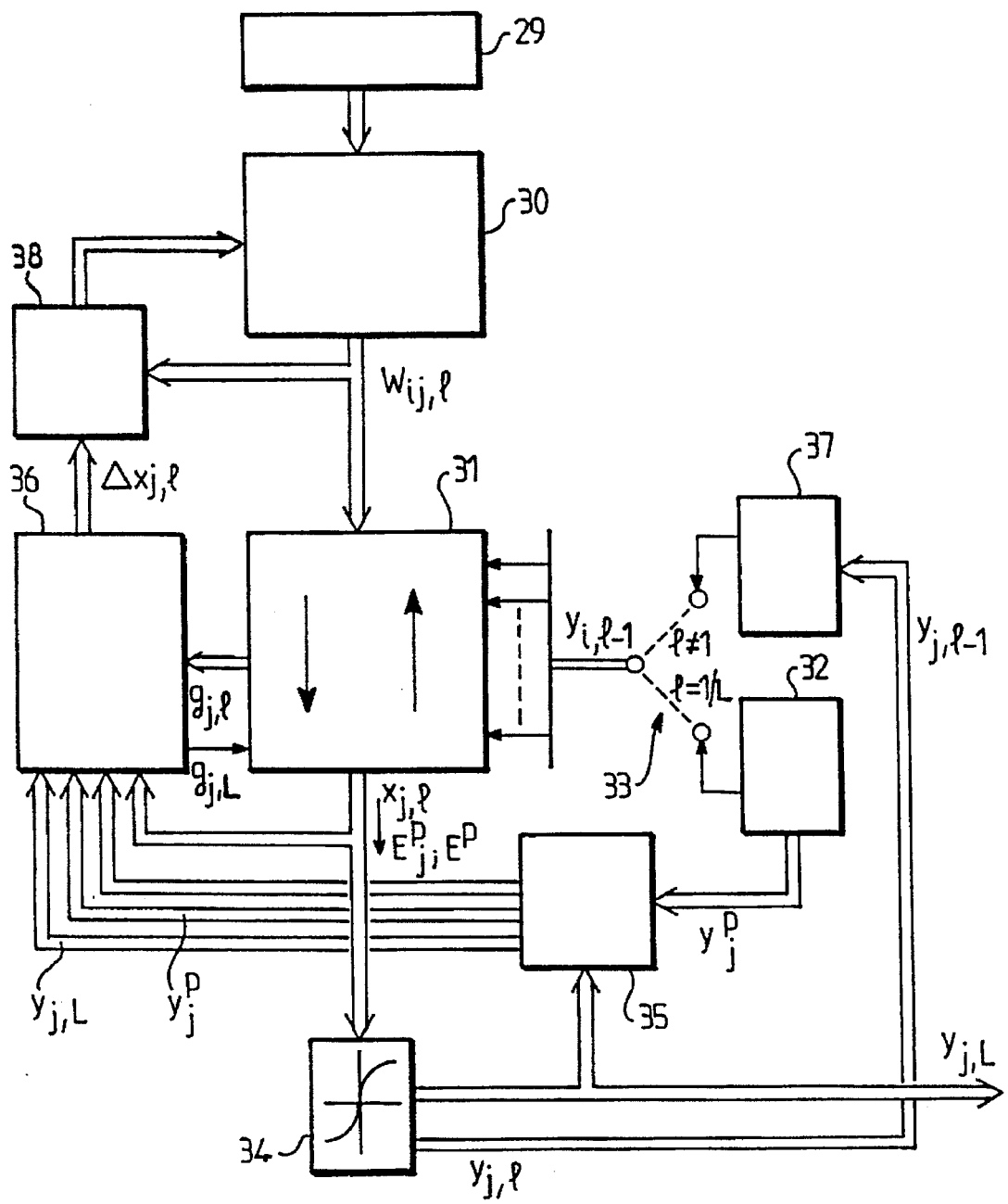
FIG. 3 shows a diagram representing a neural network structure in which the method in accordance with the invention is carried out.

These steps of the method are executed in a dedicated neural network structure as shown in FIG. 3 or in a computer programmed for carrying out the method.

The memory 30 stores, for instance, the synaptic coefficient matrix $W_{ij,l}$ and the transposed matrix $W_{ji,l}$ initially supplied by the input means 29. The synaptic coefficients are applied to calculation means 31 which receives the input potentials $y_{i,l-1}$ from the preceding layer. These means 31 determines:

$$x_{j,l}=\Sigma W_{ij,l} \cdot y_{i,l-1}.$$

On the basis of the input neuron states $y_{i,l-1}$ examples $y_{i,0}$ are applied to the input of the network. These examples are supplied by an example memory 32. A selector 33 enables this selection to be made. The example memory 32 also stores the results $y_j^p$ which have to be obtained for each example p and for each output potential j.

The states $x_{j,l}$ of the output neurons are subjected to a non-linear function in the member 34 which supplies, for each example, the output potentials $Y_{j,L}$ of the last layer L as supplied by the system. For executing the intermediate calculation steps from one layer to another, the output potentials $Y_{j,l}$ of a layer l are temporarily stored in a state memory 37 in order to be used as input states for the next layer. Each potential $Y_{j,l}$ is compared with the intended state $y_j^p$ in the comparator 35 which, moreover stores all detected errors $E_j^p$ and sums these errors in order to deliver an error $E^p$ relating to each example.

The components of the gradient $g_{j,L}$ are determined by the host computer 36. To this end, the computer receives the error $E^p$, the output potentials $y_{j,L}$ and the intended states $y_j^p$. The host computer 36 determines the components $g_{j,L}$ so that:

$$g_{j,L}=\theta_{j,L} \cdot (y_{j,L}-y_j^p) \cdot F'_{j,l}$$

where $1 \leq j \leq T(L)$, $F'_{j,L}$ are the derivatives of each non-linear function of the output layer.

These components $g_{j,L}$ are applied to the calculation means 31 which enable the execution of the gradient back-propagation method, i.e. the components $g_{j,L}$ are applied to the output layers and their effect is back-propagated to the input layers.

The components of the gradient $g_{j,l}=\alpha E^p/\alpha x_{j,l}$ (where $l \neq L$) are thus determined by the calculation means 31 by way of back-propagation of the gra. dient of the error $E^p$. The components $g_{j,l}$ are applied to the host computer 36 which determines the subsequent variations $\Delta x_{j,l}$ for each neuron state. To this end, it multiplies each component $g_{j,l}$ by its parameter $\theta_{j,l}$ in accordance with the invention.

All variations $\Delta x_{j,l}$ are applied to the updating member 38 which determines the new synaptic coefficients $W_{ij,l}$ and which applies these coefficients to the memory 30.

This process is repeated in order to execute the entire learning phase. In the course thereof the host computer 36 can apply a correction parameter $\theta_l^+$, equal or approximately equal to zero, for the first iterations, after which it can increase this parameter so as to approach the value 1 in the course of the later iterations. Moreover, the host computer 36 performs the multiplication of $E^p_j$ by the parameters $\eta_{j,l}$ before calculating the components $g_{j,l}$ in order to execute the gradient back-propagation in the calculation means 31.

When the constants $\beta_l$ relating to each layer are applied to the corrections $\theta_{j,l}\cdot g_{j,l}$ in order to determine the variations $-\Delta x_{j,l}$ proportional to $\beta_l\cdot\theta_{j,l}\cdot g_{j,l}$, the host computer does so prior to the updating of the synaptic coefficients $W_{ij,l}$ by the updating member 38.

Thus, the layered neural network structure in accordance with the invention comprises means for carrying out the learning method described above; to this end it is provided with:

- means for storing the synaptic coefficients,
- means for storing examples to be learned and introduced into the neural network,
- means for comparing, for each example, the neuron potentials obtained at the output with the results envisaged for each example and for supplying an error in conformity with the differences observed,
- means for calculating output neuron states on the basis of input neuron potentials and for performing the gradient back-propagation of said error and delivering the components $g_{j,l}$ of said gradient,
- means for applying non-linear functions at the output,
- means for calculating new synaptic coefficients, taking into account the components $g_{j,l}$ of the gradient and multiplier parameters relating to the method and enabling control of the significance assigned to given iterations of the iteration cycle or the significance assigned to given layers or given neurons of the neural network.

The diagram of FIG. 3 is given in the form of a neural network structure consisting of functional blocks which are controlled by a host computer. The functions to be realized may be integrated together in the computer itself. In that case the invention also relates to a computer which is programmed so as to perform the steps of the described method.

Table 1 represents the flow chart with the principal steps of an example of a program in accordance with the invention.

Step 1 initializes $\eta^+$ and $\theta^+$ at small positive values and fixes the temperatures $T_l$. For the layer l=1, the value $T_1$ is approximately equal to the mean of the absolute values of the inputs relating to the example p and for $l \neq 1$ the value $T_l$ is in the order of 1 (loop to l). The synaptic coefficients $W_{ij,l}$ are initialized by a random choice or to known values (loop to i and j).

Step 2 inserts the input values $y_{i,o}$ for an example p into the neural network.

Step 3 calculates the states $x_{j,l}$ and the output potentials $y_{j,l}$. The calculation of the states $x_{j,l}$ may involve a threshold $s_{j,l}$ which can also be introduced into the non-linear function F.

Step 4 applies the sign strategy to the output error. To this end, the product $y_j^p \cdot y_{j,L}$ is formed and its sign is determined. If the product is negative or zero, $\eta_{j,L}$ takes the value 1. In the opposite case, $\eta_{j,L}$ takes the value $\eta^+$.

The error $E^p$ in the output layer is determined and the components of the gradient $g_{j,L}$ are calculated.

Step 5 The derivatives $F_{j,l}$ of the non-linear functions are calculated. The components of the gradient $g_{j,l-1}$ are subsequently calculated by back-propagation of the gradient. The product $-g_{j,l}\cdot x_{j,l}$ is checked. When this product is negative or zero, $\theta_{j,l}$ is made equal to 1. When this product is positive, $\theta_{j,l}$ equals $\theta^+$, where $0 \leq \theta^+ \leq 1$. Subsequently $\beta_{j,l}$ is calculated.

Step 6 The components of the gradient $g_{j,l}$ are used for determining the subsequent variations $\Delta x_{j,l}$. This step offers a choice of an auto-adaptive function example, enabling the components $g_{j,l}$ to have an effect on the variations $\Delta x_{j,l}$. This function involves the modulus $G^2$ of the gradient $g_{j,l}$, factors $\nu$, $\xi$ which control the amplitude of the correction and the mean value $\bar{\beta}$ of the terms $\beta_{j,l}$ associated with the various neurons.

Step 7 This step enables distribution of the variations $\Delta x_{j,l}$ calculated for the example p between the synaptic coefficients $W_{ij,l}$ as well as between the thresholds $s_{j,l}$. The distribution factor is controlled by a parameter $\delta_l$ which applies the norm $$\sum_i y_{i,l-1}^2.$$

This step 7 represents an example of the distribution which enables the norm of the synaptic coefficients to be maintained quasi-constant for a given output neuron. The changes must be realized with variations of the weight and the thresholds which are as small as possible.

Step 8 When the accumulated error $$\sum_{p=1}^{p=P}$$

$E^p$ for all examples is smaller than or equal to a predetermined value $\epsilon$, learning has been completed. When this error is greater than $\epsilon$, the procedure continues with the following steps.

Step 9 The temperatures $T_l$ are slightly lowered and, therefore, the initial value is multiplied by a parameter $\epsilon_l$ of between 0 and 1.

Step 10 The values of $\eta^+$ and $\theta^+$ are re-adjusted.

Step 11 Another example p' is selected and the operation recommences with the step 2.

TABLE 1
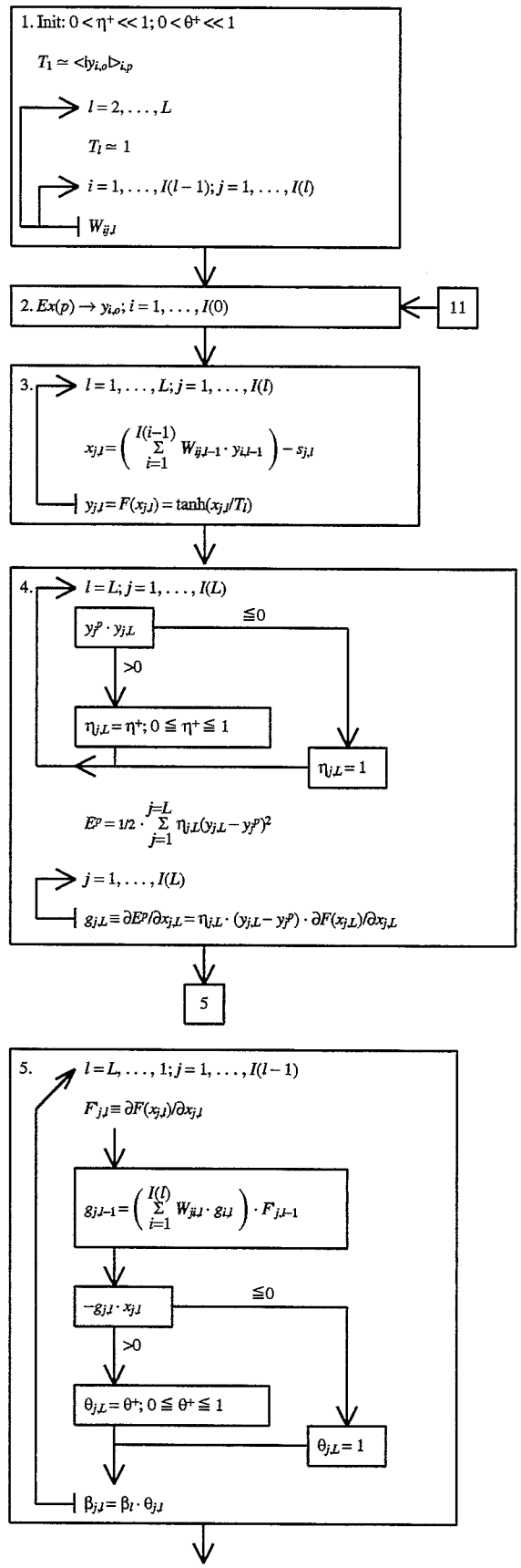
TABLE 1-continued
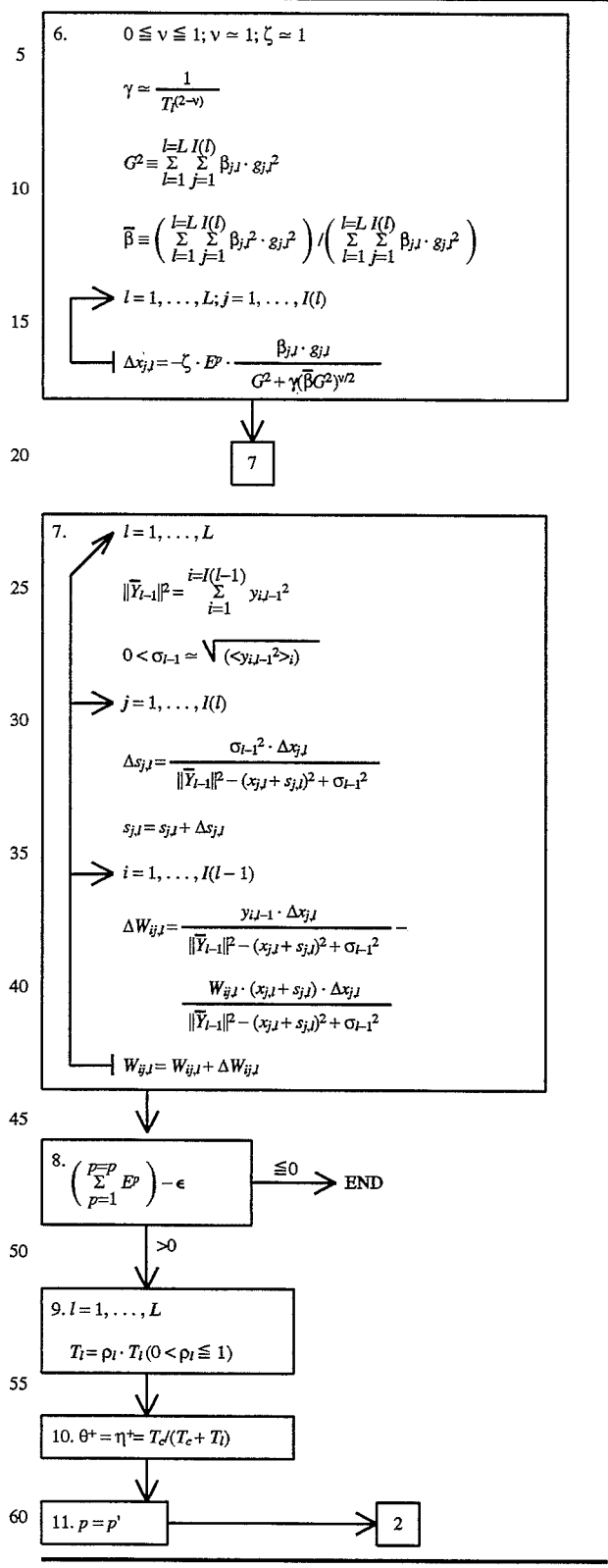
I claim:
1. A learning method for, training a neural network, under the control of error-backpropagation, the network including neurons organized in successive layers among which there are an input layer and an output layer, a state of a neuron j in a layer l being determined according to the equation:

$$x_{j,l} = \Sigma W_{ij,l} Y_{i,(l-1)};$$

wherein:
a) $Y_{j,(l-1)}$ is an output potential of a neuron i in a preceding layer l-1, and
b) $W_{ij,l}$ is a synaptic coefficient, representative of a coupling from the neuron i to the neuron j, the neural network including a computer memory for storing a value of the synaptic coefficient to be retrieved for use after training, the method comprising the steps of:
i) determining a value of a quantity E representative of a discrepancy between actual result and desired result at a neural net output at the output layer;
ii) determining for a particular neuron j in layer 1 a value of a partial derivative $g_{j,l}$: $g_{j,l} = \alpha E/\alpha x_{j,l}$;
iii) producing a product of $g_{j,l}$ and $x_{j,l}$;
iv) rescaling the product by a first factor if the partial derivative $g_{j,l}$ and the state $x_{j,l}$ have opposite polarities, for producing an increment $\Delta W_{ij,l}$;
v) rescaling the product by a second factor if the partial derivative $g_{j,l}$ and the state $x_{j,l}$ have equal polarities, for producing the increment $\Delta W_{ij,l}$;
vi) updating the value of the synaptic coefficient $W_{ij,l}$ with the increment $\Delta W_{ij,l}$; and
vii) storing the updated value in the computer memory.

2. A method as in claim 1 wherein the value of the synaptic coefficient $W_{ij,l}$ is updated iteratively in a sequence of cycles, each including the steps i)–vii), and wherein before at least one particular cycle the value of one of said first and second factors is increased.

3. A method as in claim 1, comprising:
a) iteratively updating the value of the synaptic coefficient $W_{ij,l}$ in a sequence of cycles, each cycle including the steps i)–vii);
b) in each cycle applying a sigmoid function F to the state $x_{j,l}$ of the neuron j in the layer l for providing an output potential $Y_{j,l}$, the sigmoid function F having a steepness dependent on a value of a parameter T;
c) before at least one particular cycle, increasing the steepness by changing the value of the parameter T.

4. A method as in claim 1, wherein the determining of the quantity E as representative of said discrepancy comprises the steps of:
a) determining, for each neuron of the output layer, a partial discrepancy between the output potential, obtained as a result of supplying an input example to the input layer, and a desired potential;
b) determining if a polarity of the output potential and a polarity of a desired output potential are equal;
c) forming weighted contributions to the quantity E by scaling each partial discrepancy by a polarity factor having a value between 0 and 1 if the potential polarities are equal.

5. A method as in claim 1 wherein for each respective one of the successive layers 1 producing the increments $\Delta W_{ij,l}$ by rescaling the product by a respective further factor, the further factor for each one of the successive layers being smaller tkan the further factor of a preceding layer.

6. A trainable neural network including:
a) neurons functionally organized in successive layers, among which there are an input layer and an output layer, a state $x_{j,l}$ of a neuron j in a layer l being determined according to the equation:

$$x_{j,l} = \Sigma W_{ij,l} Y_{i,(l-1)};$$

wherein:
i) $Y_{i,(l-1)}$ is an output potential of a neuron i in a preceding layer l-1, and
ii) $W_{ij,l}$ is a synaptic coefficient, representative of a coupling from the neuron i to the neuron j;
b) a memory for storing a value of the synaptic coefficient to be retrieved for use after training;
c) computating means coupled to the memory and using error-back propagation, for determining a value of a component $g_{j,l}$ of a gradient of an error function E in a state space according to: $g_{j,l} = \alpha E/\alpha x_{j,l}$;
d) a multiplier coupled to the computating part for outputting a value of a product $g_{j,l} x_{j,l}$;
e) a polarity checker coupled to the multiplier to determine a polarity of the product;
f) a scaling means coupled to the multiplier for, under control of the polarity checker, scaling the product by a first factor if the polarity is negative and scaling the product by a second factor which has larger absolute value than the first factor if the polarity is positive;
g) updating means coupled to the scaling means and the memory for supplying an increment $\Delta W_{ij,l}$ proportional to the scaled product and for updating the value of synaptic coefficient $W_{ij,l}$ and storing the updated value in the memory.

7. A neural network as in claim 6 wherein the computing part, the multiplier, the polarity checker, the scaling means, and the updating means are elements, and at least one of said elements is included in a general purpose computer.

* * * * *